Oct. 13, 1964          A. E. FENTIMAN          3,152,819
                       KEY AND KEYWAY JOINT

Filed Jan. 25, 1961                            3 Sheets-Sheet 1

INVENTOR
ARTHUR E. FENTIMAN
ATTORNEY

Oct. 13, 1964   A. E. FENTIMAN   3,152,819
KEY AND KEYWAY JOINT
Filed Jan. 25, 1961   3 Sheets-Sheet 2

INVENTOR
ARTHUR E. FENTIMAN
ATTORNEY

Oct. 13, 1964 A. E. FENTIMAN 3,152,819
KEY AND KEYWAY JOINT
Filed Jan. 25, 1961 3 Sheets-Sheet 3

INVENTOR
ARTHUR E. FENTIMAN
ATTORNEY 3,152,819
KEY AND KEYWAY JOINT
Arthur E. Fentiman, Stittsville, Ontario, Canada, assignor to Clarence Frank Fentiman, Arthur Edward Fentiman, and Harold Gordon Fentiman, trading as Triodetic Structures, Ottawa, Ontario, Canada
Filed Jan. 25, 1961, Ser. No. 84,815
4 Claims. (Cl. 287—20.1)

My invention relates to a key and keyway joint for structural assemblies and the like and appertains particularly to a connector, having two or more elongated keyways therein with their longitudinal medians in angular relation, capable of assuming a great variety of forms to meet engineering problems of all sorts in structural work and also for use in other commercial fields.

This invention is closely related to my prior inventions disclosed in United States Patents Nos. 2,931,467; 2,964,-147; 2,916,109; 2,895,753 and also in United States patent applications Serial Nos. 559,988; 814,040 and 844,910, now respectively United States Patents Nos. 2,976,968; 3,079,681; and 3,087,601.

It will be observed that in these United States patents and patent applications I have used a common keyway type connector to facilitate the assembly of elements or instrumentalities into fabrications of many forms involving the use of such connectors together with tensile and compression members engaged therewith which are necessary and which contribute to the completion of the structure being fabricated.

I have used a common connector to facilitate the assembly of diverging elements or instrumentalities in the fabrication of various forms of structure both in the scientific field and in the commercial field and with very good results, since when these structures are so assembled the connectors and co-acting members are self sufficient and self sustaining without the need of any other extraneous securing or connecting means.

In contemporary structural art necessitating the assembly of two or more diverging members it is generally found necessary to resort to the use of additional connecting means above and beyond the diverging elements and their co-acting interconnecting members, and this reliance on additional assembly instrumentalities has not only added to the costs of constructions but also to the costs of maintainence of the finished or completed structures, to the overall weight of such assemblies and to the bulk and awkwardness of the joints themselves.

The necessity for such additional, securing members is evident in structures utilizing not only tensile connecting members but also compression members, and one example of this is where angularly disposed thrust members are necessary for the completion of such structures.

The need for such additional securing means when thrust members are used in structural assemblies is evident since the lines of force of the thrust members are, when in use, divided into component parts, one set of lines of force being tangential to a connector while the other lines of force extend radially or normally from such connector.

This dividing of the lines of force into its component parts is not beneficial to efficiency as it impairs the ultimate strength of a structure since the full tensile or compressive strength of the several members in the structure is not properly available to give the desired rigidity to the completely fabricated structure, and in many cases heavier structural elements are required to afford a proper factor of safety.

These difficulties arise principally from the inefficient manner of connecting or assembling tensile and compression members with common connectors, and the axial lines of force of the compression members are so disposed at the junction with the connectors that the lines of force are resolved into diverging components which include those disposed at right angles or normal to the connector and those which are parallel to the longitudinal axis of the connectors.

The efficient use of tensile and/or compressive strength of diverging structural members requires that the total strength of these instrumentalities be properly applied, so that the lines of force must not be divided, but that each structural member should be so disposed as to effectively apply its total unimpaired strength either tensile or compressive to give maximum strength to the fabricated structure.

Where a force has to be resolved into two diverging components it will be evident that each component is not as strong as if the original force had not been so divided, and I have come to the conclusion that if a primary force can be directly applied to a connector without subdividing such force, then a stronger and more efficient construction can be made.

I am aware that elbows, tees, union couplings and like conventional instrumentalities have been used in wall structures, scaffolds and the like in which rods are threaded into these couplings, or the rods are telescoped into these couplings and secured thereto by cotter pins, bolts, etc. but such structures all possess inherent structural weaknesses and are difficult to repair, sometimes necessitating the dissembling of a large portion of the structure before adequate repairs can be made, and this type of repair work is very costly and I wish to avoid such a procedure.

I am also aware that with the use of compression members in some structures it has been found necessary to rely on outside additional agencies such as bolts and nuts with appropriate covers and washers to secure and retain the compression members firmly attached to the connectors with which they are assembled, and this dependence on these additional agencies has incurred the increase of man hours in the assembly of such structures.

In my patents and/or applications mentioned above I have disclosed the use of a key member making edgewise engagement with a keyway, and I wish to adopt this principle of connection in my present invention on account of the ease and rapidity with which the co-acting parts can be assembled.

This leads directly to the essence of my present invention, in which axial lines of force of tension or compression members can at all times be effectively applied to a common connector so that the lines of force of the tension or compression members will always be normal (i.e. at right angles) to the connecting media, and in this way the full undiminished strength of the tensile and compression members is properly applied to the assembled structure to give maximum and more effective strength to the resulting structure. Because the lines of force are thus applied directly, there is no resolution of forces that would tend to displace the key parts in the keyways of the connector. A further advantage resulting from a joint with direct lines of force is that equal strength is obtained with the use of less material and that the final overall assembly is of substantially lighter weight.

The objects of my invention may be referred to as follows:

One of the objects of my invention is to fabricate a connector for use with co-acting tensile and compression members so that the connection made will be self sufficient and will not require the addition of other fastening means such as bolts, washers, cotter pins or the like.

A further object of my invention is to provide a connector for use with tensile and compression members whereby the ultimate strength of these members with the connector will provide a high factor of safety with a relatively light weight of structure.

Another object of my invention is to construct a connector so that when diverging members are used they will be directly attached to the connector or interlocked therewith, and will at all times be normal to the longitudinal axis of the interlocking connections, so that the undivided strength of such diverging members will be available to resist tensile or comprehensive stresses between them and the connector.

A further object still of my invention is to construct a connector and its connecting media with other structural members whether tensile or compressive, so that the connector with its connecting media may be used in all forms of structures including single or multiple planar walls, arcuate walls, roof structures, either planar, arcuate or of domed configuration, or of any geometrical shape or configuration, also beams, doors, boats wharves, furniture structures, and in a wide range of other commercial fields.

Still another object of my invention is to form the connectors with keyways open at least at one end and to form diverging members with transverse key ends which co-act with the keyways so that the key ends of the diverging members will lie wholly within the confines of the keyways, and thus the lines of force in the diverging members will lie entirely within the confines of the keyway.

Other objects will be made clear as the specification develops.

So that the nature of my invention will be clearly understood, I have illustrated several forms of connector embodying my invention, but I wish it to be understood that my invention is not limited to these specific forms which are illustrated, but that changes may be made in the contour of the connectors to permit of the engagement of various forms of diverging members being attached to the connectors in the manner best suited to the carrying out of my invention without departing from the spirit thereof.

In the drawings.

Like characters of reference refer to like parts in the several associated figures of the drawings.

Figure 1:
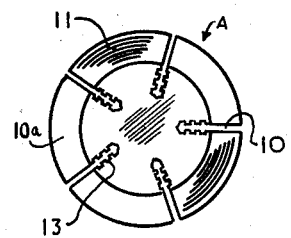
FIGURE 1 is a view of one end of a connector formed with diverging keyways and adapted for use in fabricating walls, roofs, reflectors, radar receivers etc., formed with a curvilinear dished or arcuate skeleton wall.
Figure 2:
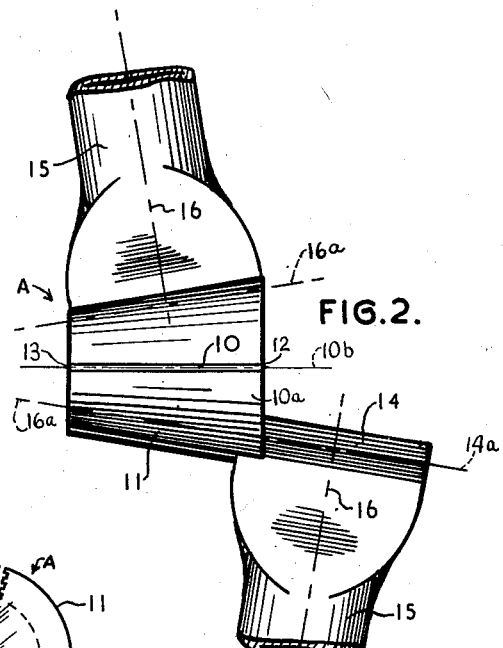
FIGURE 2 is a side view of the connector.
Figure 3:
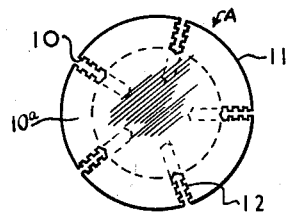
FIGURE 3 is a view similar to that shown in FIGURE 1 but showing the opposite end of the connector.

Referring to FIGURES 1 to 4 of the drawings, A represents a connector which is frusto-conical, or it may be frusto-pyramidal, preferably comprising an elongated body portion $10^a$ having a longitudinal axis $10^b$ extending in a right line. Body portion $10^a$ is preferably provided with a plurality of longitudinally extending keyways 10 in the outer peripheral wall.

These connector keyways 10 converge towards the smaller end of the connector A, and the ends 12 and 13 of the keyways are open, or at least one is open, and the outer boundary of each keyway is open from one end of the keyway to the other end.

The keyways 10 here shown are equidistantly spaced around the peripheral wall 11 of body portion $10^a$, each keyway 10 having a longitudinal median $16^a$ extending in a right line. In the frusto-conical form shown, the right longitudinal medians $16^a$ of the keyways 10 extend angularly with respect to one another and angularly with respect to the right longitudinal axis of body portion $10^a$, angularly converging toward one end of body portion $10^a$ and angularly diverging toward the opposite end of body portion $10^a$.

Each keyway is of uniform depth and cross section throughout its length, and is engaged by an elongated key shaped end 14 which extends transversely across the end of a tensile or compressive member 15, the ends of which members are flat or partially flattened to form such key end.

The key shaped ends 14 are inserted edgewise and driven into their co-acting keyway 10, and the edges of the key ends 14 when in fully inserted or final position are seen flush with the ends 12 and 13 of the keyway. It will be observed that the longitudinal axis 16 of the members 15 extend in a right line and that the key 14 of each member 15 has a longitudinal axis $14^a$ which extends in a right line with respect to the longitudinal axis 16 thereof. As illustrated, each key 14 is of a configuration for engageable interlocking insertion within a keyway 10 in juxtaposition so that the right longitudinal axis $14^a$ thereof is conterminous with the right longitudinal median $16^a$ of the keyway 10 receiving the same. Thus, the right longitudinal axis 16 of members 15 are at right angles to the longitudinal median of the keyway and these members are thus always "normal" to the longitudinal median of their co-acting keyways.

This is of extreme importance since this assembly provides that the full or complete tensile lines of force or the compressive lines of force will always terminate within the keyways, so that these lines of force cannot be resolved into component forces as would be the case if the longitudinal axis of the members diverged from the normal position referred to above.

Figure 4:
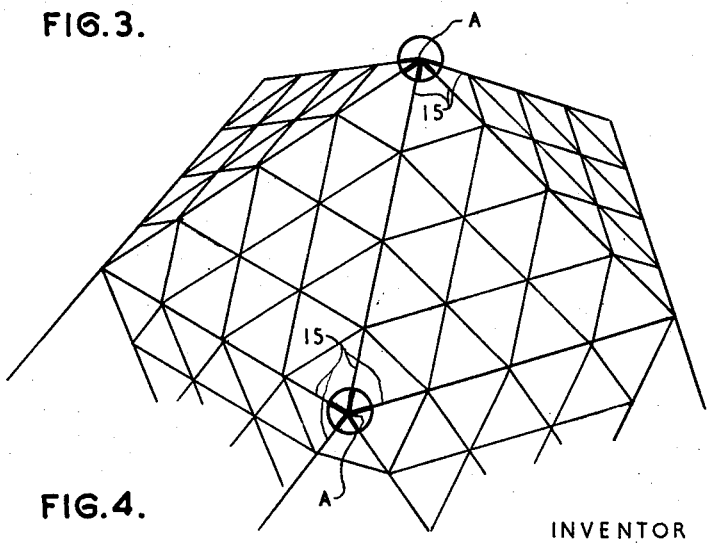
FIGURE 4 is a fragmentary view of a curved structure such as a dished radar receiver or curved roof structure formed by such connectors with their several co-acting rods or tubes.
Figure 5:
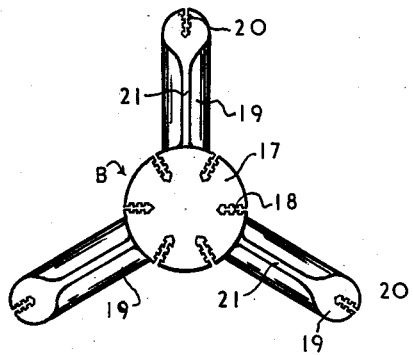
FIGURE 5 is an end view of another form of my improved connector showing angularly disposed diverging arms formed with keyways and spaced intermediate of the keyways formed in the central portion of the connector, the arms being integral with the said central portion.
Figure 6:
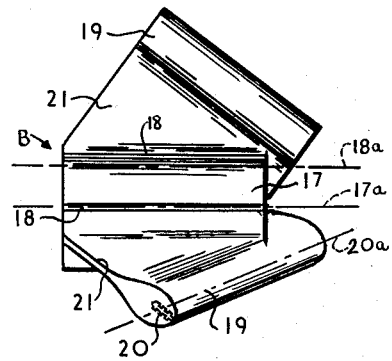
FIGURE 6 is a side view of the connector shown in FIGURE 5.
Figure 7:
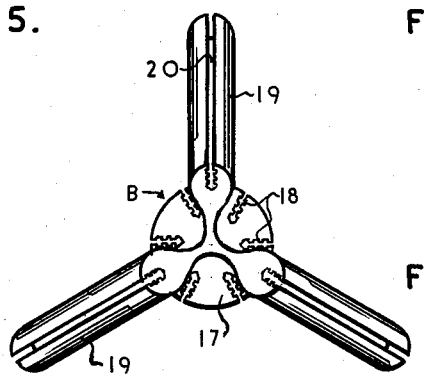
FIGURE 7 is an end view of the connector showing the opposite end to that illustrated in FIGURE 5.

Referring to FIGURE 4 which shows a fragmentary portion of a dome, dished or arcuate structure, it will be understood that the lateral conical walls of each connector A converges towards the apex of the cone which lies within the confines of the concave structure. The members 15 are connected at each end to a connector A so that when these members are assembled those in alignment form arcs or great circles, and these arcs intersect transversely across each other.

In this structure the members 15 are at all times under tension and the maximum strength of this structure lies in the fact that the lines of force of each member 15 are normal to the co-acting keyways in the engaging connector.

An external force applied to this domed, dished or arcuate structure would be uniformly distributed through the various great circles which intersect at the point or the area at which the force is applied.

This continual tensile pull on the member 15 tends to draw the key ends of the members more intimately into engagement with the co-acting keyways in the connector A, so that while the structure is light it has a maximum strength commensurate with the full tensile stress which the member 15 will withstand.

It is pointed out that the fabrication of this arcuate or domed structure is accomplished by the connector A which is standardized, and also by the formation and length of the members 15 which are also standardized, so that the articulation is accomplished by these two types of members only and no additional or external members are required.

Referring now to FIGURES 5 to 8, the connector B preferably comprises an elongated body portion 17 having a longitudinal axis $17^a$ extending in a right line. Body portion 17 is preferably provided with a plurality of angularly disposed elongated keyways 18 which extend the full length of the outer perimeter of this core and are equidistantly spaced apart.

Each keyway 18 has a longitudinal median $18^a$ extending in a right line parallel to the longitudinal axis $17^a$ of body portion 17.

The members 15' which are to be attached to the connectors are provided with flattened transverse key ends to make edgewise connection with the keyways 18 and the longitudinal axis of each member 15' is at right angles or normal to the longitudinal median of its co-acting keyway.

To provide for the attachments of angularly disposed diverging members such as struts to this connector B, body portion 17 may include a plurality of angularly disposed arms 19, the outer walls of these arms being disposed so that they would lie within a hollow circumscribing cone and the arms are located at 120° apart, and spaced between these arms are the keyways 18. While the outer surface of the lateral walls of each arm is arcuate, nevertheless these arms might be rectangular or other suitable geometrical shape, but the important point is that these arms would lie within a circumscribing cone with the outer crests or faces of the arms coinciding with the inner walls of the cone.

Each of these arms 19 is provided in its outer periphery with a keyway 20 similar to the keyways 18, except that the keyways 20 diverge at angles of 120° to each other, the right longitudinal medians $20^a$ above the keyways 20 extending angularly with respect to one another and angularly with respect to the right longitudinal axis $17^a$ of body portion 17, angularly converging toward one end of body portion 17 and angularly diverging toward the opposite end of body portion 17. The arms 19 are formed integral with body portion 17, being connected by webs 21 so that each connector B forms a complete integral unit.

The keyways 18 and 20 are similar in all respects being of uniform cross section throughout their length, and these keyways are of uniform depth with one end at least of the keyway being open, and their outer side is also open. These keyways may if desired be open at both ends.

Diverging members 15', similar to member 15 of FIGURES 1 to 4 are provided with transverse key ends which make edgewise connections with either of the keyways 18 or 20, the keys being driven edgewise into the said keyways to make tight fitting or intimate and self-binding contact therewith.

Members 15' coact with keyways 18 and 20 in the same manner as previously described with respect to co-action of members 15 with connector A, and the longitudinal median $18^a$ and $20^a$ of the keyways 18 and 20 and the longitudinal axis of the diverging members 15' which are connected with the keyways are at right angles or normal to each other, so that the axial lines of force whether tensile or compressive of each member will lie within the confines of the keyway at the terminal ends of the members, and being normal (i.e. at right angles or perpendicular thereto, the strength of the assembly of connectors and the diverging members will be unimpaired throughout the joint.

Figure 8:
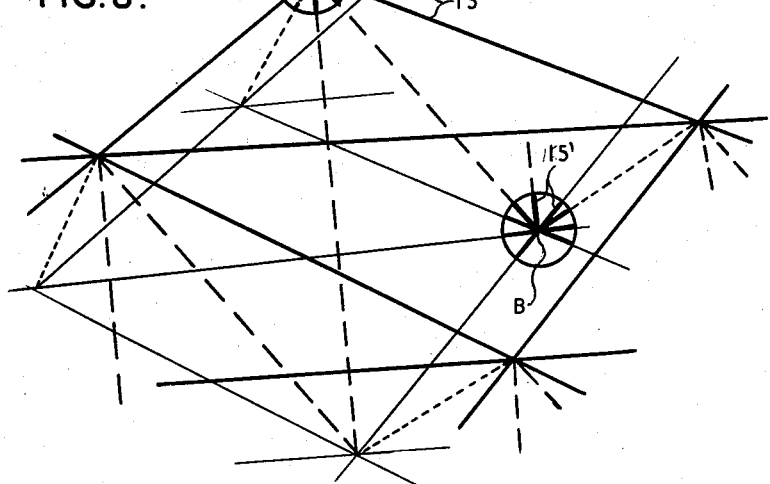
FIGURE 8 is a view of the connector illustrated in FIGURES 5 to 7 when used in the construction of multi-planar walls, roofs etc., and showing radial rods keyed to co-acting connectors and also angularly disposed struts connected to and extending between such connectors when used in wall construction.
Figure 9:
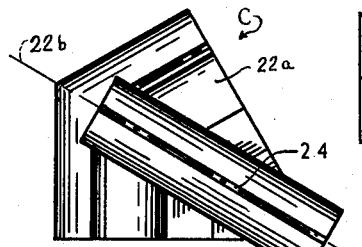
FIGURE 9 is an end view of a further form of my connector showing the disposition of several angularly disposed arms or connecting media for use in girder or other forms of skeleton structures.

In FIGURE 8 a structure is illustrated which utilizes the connectors B and the assembly member 15'. The radially extending members 15' are keyed to the keyways 18 in body portion 17, and these radial members lie in a plane surface. However, the angularly disposed diverging members 15' which constitute struts are keyed to the keyways 20 in the angularly disposed diverging arms 19.

It will be noted that this structure is erected by the use of only two standardized members and that no additional or external members are required to complete the structure.

This form of structure is easily assembled by partly skilled labour since there are only the two elements of construction to be considered, namely the connector B and the assembly members 15' and only a hammer is required to force the key ends of the members 15' which may be slightly compressible into engagement with their co-acting close tolerance keyways in the connector.

Referring now to FIGURES 9 to 13, another development of my invention is illustrated in which the connector C includes body portion $22^a$ having a longitudinal axis $22^b$ extending in a right line. Body portion $22^a$ preferably includes a pair of parallel spaced cylindrical members 22 which are connected by a web 23, and in the outer wall of each cylindrical member a keyway 24 is provided.

In depth these keyways 24 are similar and in alignment, and the keyways may be open at one end or at both ends, and the outer portion of the keyway is open throughout the length of the keyway.

Each keyway 24 has a longitudinal median $24^a$ extending in a right line parallel to the right longitudinal axis $22^b$ of body portion $22^a$.

Body portion 22a preferably includes a plurality of cylindrical members 25, 26 and 27 which are angularly disposed with respect to the cylindrical members 22 and diverge to each side of the cylindrical members 22. The outer periphery of the cylindrical members 25, 26 and 27 are each provided with a keyway 28 which extends the complete length of the cylindrical members 25, 26 and 27. All the keyways in this form of the connectors are similar, being of uniform depth, and the cross section of each keyway is similar the one to the other.

As illustrated, the right longitudinal median $28a$ of each keyway 28 of each the members 25, 26 and 27 are angularly disposed with respect to the right longitudinal axis $22b$ of body portion 22a, and angularly disposed with respect to the right longitudinal median $24a$ of keyways 24, angularly converging toward one end of body portion 22a and angularly diverging toward the opposite end of body portion 22a. Diverging tensile and/or compression members 29 are formed with end keys which will engage with a co-acting keyway in endwise engagement, in the same manner as previously described with respect to diverging members 15 and 15' of connectors A and B, and all the cylindrical members 22, 25, 26 and 27 are connected by webs so that the connector is integral and unitary in construction.

The compression and tensile members when assembled with this connector C are disposed with their longitudinal axis normal or at right angles to the longitudinal median of its co-acting keyway, so that the lines of force of each member extends into the keyway with which the respective members engage.

As in the other forms of my invention the lines of force of the tensile or compressive members are thus properly disposed relatively to their co-acting keyways so that no additional external means is required to maintain the connector in proper engagement with its co-acting tensile and compressive members to impart a fully unimpaired force to the connector.

Figure 12:
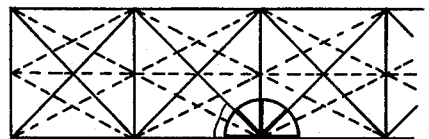
FIGURE 12 is a schematic view of a skeleton structure in which the connector is that shown in FIGURES 9 to 11.
Figure 10:
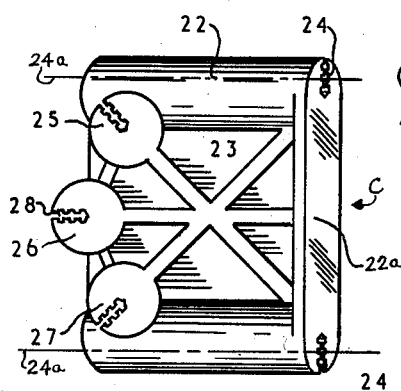
FIGURE 10 is a side view of the connector shown in FIGURE 9.
Figure 11:
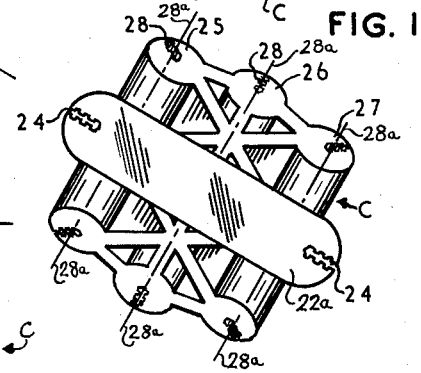
FIGURE 11 is another side view of the connector angular to that illustrated in FIGURE 10.
Figure 13:
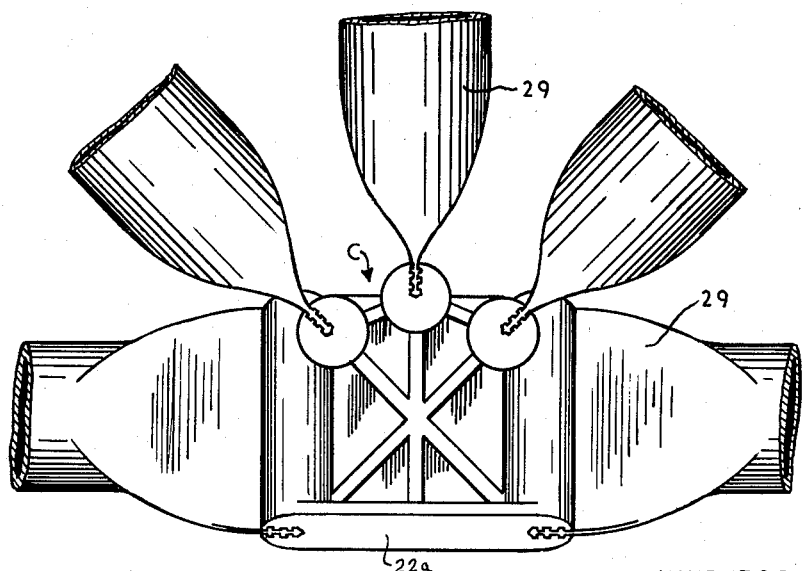
FIGURE 13 is a semi-perspective view of the connector illustrated in FIGURES 9 to 11 and showing several of the tubular members or rods held in assembled position with such connectors.

This connector C as shown in FIGURE 12 is an assembly such as required in skeleton girder or like work.

From the foregoing description it will be clear in the novel joint disclosed herein the connector is capable of assuming many widely different shapes and forms that have developed from the simple hub-type connectors of my previous inventions. In the present joint there are two or more keyways with their longitudinal medians in angular relation. In this context, "two" means—at least two—or—two or more. Furthermore, a keyway with two parts lying in angular relation must be considered as two keyways in the interpretation of this specification. Keyways may be sized and spaced as required.

The keys, variously referred to as keys, key members, diverging members, tensile members and compression members, connecting media, angularly disposed arms are the parts singular or plural that are inserted into the keyways of the connectors, longitudinally of such keyways and may assume any of an infinite variety of shapes and forms.

Always the keys or diverging members are disposed normal to the keyways, i.e. they extend at right angles or perpendicular to the longitudinal median of their respective keyways, so that by fabricating the connectors as by casting, broaching or otherwise forming them of metal, plastic, or other suitable material with their keyways in predetermined angular relation, the geometry of the ensuing structure results automatically.

What is claimed is:

1. In a joint, the combination of a connector including an elongated body portion having a longitudinal axis extending in a right line, said elongated body portion of said connector including a plurality of elongated keyways each having a longitudinal median extending in a right line, said longitudinal median of said elongated keyways extending angularly with respect to one another and with respect to said longitudinal axis of said elongated body portion in juxtaposition to angularly converge toward one end of said elongated body portion and angularly diverge toward the opposite end of said elongated body portion, and a plurality of diverging members attached to said connector, at least some of said diverging members including an elongated key at the end thereof attached to said connector, each said elongated key having a longitudinal axis extending in a right line normal to the longitudinal axis of the elongated diverging member of which it is a part, and an external configuration for engageable interlocking insertion within a keyway of said connector in juxtaposition with the longitudinal axis of the inserted elongated key conterminous with the longitudinal median of the keyway in which it is inserted, each said diverging member having an elongated key at the end thereof attached to said connector being attached to said connector with the elongated key thereof inserted in an elongated keyway of said connector in juxtaposed interlocking engagement with the longitudinal axis of the elongated key inserted conterminous with the longitudinal median of the elongated keyway receiving the same.

2. In a joint, the combination of a connector including an elongated body portion having a longitudinal axis extending in a right line, said elongated body portion of said connector including a plurality of elongated keyways each having a longitudinal median extending in a right line, said longitudinal median of at least a pair of said elongated keyways extending angularly with respect to said longitudinal axis of said elongated body portion, and a plurality of diverging members attached to said connector, at least some of said diverging members including an elongated key at the end thereof attached to said connector, each said elongated key having a longitudinal axis extending in a right line normal to the longitudinal axis of the elongated diverging member of which it is a part, and an external configuration for engageable interlocking insertion within a keyway of said connector in juxtaposition with the longitudinal axis of the inserted elongated key conterminous with the longitudinal median of the keyway in which it is inserted, each said diverging member having an elongated key at the end thereof attached to said connector being attached to said connector with the elongated key thereof inserted in an elongated keyway of said connector in juxtaposed interlocking engagement with the longitudinal axis of the elongated key inserted conterminous with the longitudinal median of the elongated keyway receiving the same.

3. In a joint, the combination of a connector including an elongated body portion having a longitudinal axis extending in a right line, said elongated body portion of said connector including a plurality of elongated keyways each having a longitudinal median extending in a right line, with the right longitudinal median of at least a pair of said elongated keyways extending normal to said longitudinal axis of said elongated body portion, and a plurality of diverging members attached to said connector, at least some of said diverging members including an elongated key at the end thereof attached to said connector, each said elongated key having a longitudinal axis extending in a right line normal to the longitudinal axis of the elongated diverging member of which it is a part, and an external configuration for engageable interlocking insertion within a keyway of said connector in juxtaposition with the longitudinal axis of the inserted elongated key conterminous with the longitudinal median of the keyway in which it is inserted, each said diverging member having an elongated key at the end thereof attached to said connector being attached to said connector with the elongated key thereof inserted in an elongated keyway of said connector in juxtaposed interlocking engagement with the longitudinal axis of the elongated key inserted conterminous with the longitudinal median of the elongated keyway receiving the same.

4. In a joint, the combination of a connector including an elongated body portion having a longitudinal axis extending in a right line, said elongated body portion of said connector including a plurality of elongated keyways each having a longitudinal median extending in a right line parallel to said longitudinal axis of said elongated body portion, and a plurality of elongated arms attached to said connector, at least some of said elongated arms including an elongated key at the end thereof attached to said connector, each said elongated key having a longitudinal axis extending in a right line normal to the longitudinal axis of the elongated arm of which it is a part and an external configuration for engageable interlocking insertion within a keyway of said connector in juxtaposition with the longitudinal axis of the inserted elongated key conterminous with the longitudinal median of the keyway in which it is inserted, each said elongated arm having an elongated key at the end thereof attached to said connector being attached to said connector with the elongated key thereof inserted in an elongated keyway of said connector in juxtaposed interlocking engagement with the longitudinal axis of the elongated key inserted conterminous with the longitudinal median of the elongated keyway receiving the same.

References Cited in the file of this patent

UNITED STATES PATENTS

| | | |
|---|---|---|
| 595,875 | Ernest | Dec. 21, 1897 |
| 1,067,819 | Kemp | July 22, 1913 |
| 1,431,272 | Van Coot | Oct. 10, 1922 |
| 1,494,780 | Ford | May 20, 1924 |
| 2,149,844 | George | Mar. 7, 1939 |
| 2,251,112 | Butler | July 29, 1941 |
| 2,904,361 | Deenik et al. | Sept. 15, 1959 |
| 2,916,109 | Fentiman | Dec. 8, 1959 |
| 2,931,467 | Fentiman | Apr. 5, 1960 |

FOREIGN PATENTS

| | | |
|---|---|---|
| 271,709 | Great Britain | June 2, 1927 |
| 752,968 | France | July 13, 1933 |